(Model.)

T. B. JEFFERY.
DRIVE CHAIN.

No. 533,957.  Patented Feb. 12, 1895.

Witnesses
Jean Elliott
John R. Nettenstrom

Inventor
Thos. B. Jeffery
By his Attorneys
Burton and Burton

UNITED STATES PATENT OFFICE.

THOMAS B. JEFFERY, OF RAVENSWOOD, ILLINOIS.

DRIVE-CHAIN.

SPECIFICATION forming part of Letters Patent No. 533,957, dated February 12, 1895.

Application filed March 5, 1889. Serial No. 302,033. (Model.)

*To all whom it may concern:*

Be it known that I, THOMAS B. JEFFERY, a citizen of the United States, residing at Ravenswood, county of Cook, and State of Illinois, have invented certain new and useful Improvements in Drive-Chains, which are set forth in the following specification, reference being had to the accompanying drawings, forming a part thereof.

Figure 1:
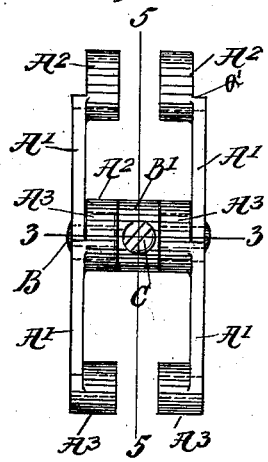
Figure 2:
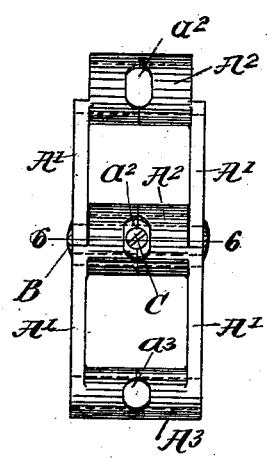
Figure 3:
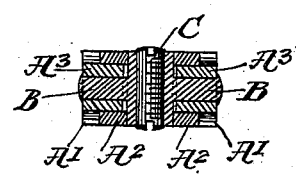
Figure 4:
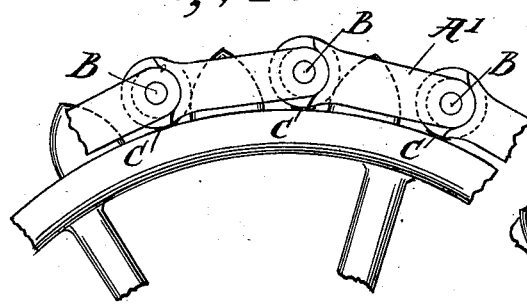
Figure 5:
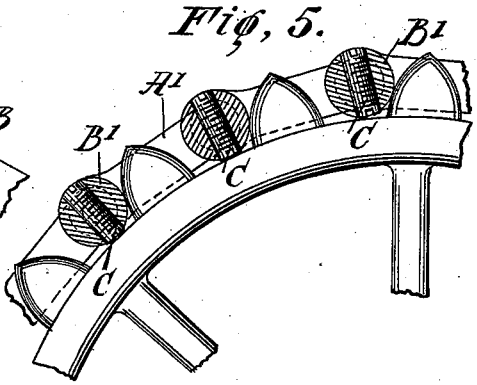
Figure 7:
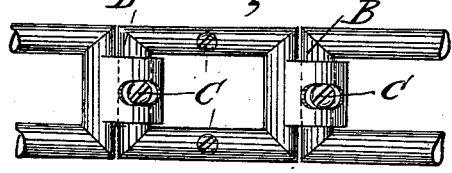
Figure 6:
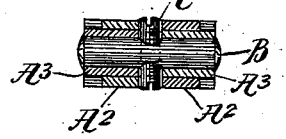
Figure 8:
Figure 9:
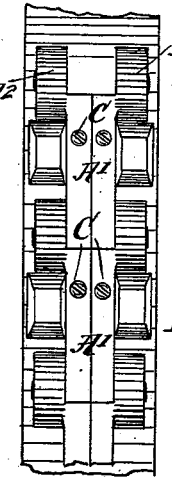

In the drawings, Figure 1 is a plan of a portion of the drive chain embodying my invention. Fig. 2 is a plan of a modified form embodying my invention. Fig. 3 is a section at the line 3—3 on Fig. 1. Fig. 4 is a side elevation of a portion of a drive chain of the form shown in Fig. 1, running upon a sprocket wheel of which a portion is shown. Fig. 5 is a section through the portion of the wheel and chain shown in Fig. 4, section cutting the chain at the plane indicated by the line 5—5 on Fig. 1. Fig. 6 is a section at the line 6—6 on Fig. 2. Fig. 7 is a plan of a familiar form of the drive chain having one feature of my invention added thereto. Fig. 8 is a side elevation of the same. Fig. 9 is a plan of a modified form of link placed on a wheel having split sprockets.

One purpose of this invention is to render a drive chain adaptable, within moderate limits, to different sprocket wheels; particularly, however, for the purpose of adapting a chain to a sprocket wheel over which it has been running for a sufficient time to wear both the wheel and the pivots of the links, by an adjustment which shall compensate for that wear.

In Figs. 7 and 8, I have shown the means for accomplishing this purpose applied to a familiar and simple form of link, and I will describe first this feature by itself.

Either in the cross bar or in the longitudinal bar of the link, there is inserted a screw C, extending transversely to the plane of the link,—that is to say, to the plane which contains the axes of the two pivots of the link to its adjacent links. When the chain is first put to use if it is properly adapted to the sprocket wheel, the screw C will be set so that the end toward the wheel does not protrude far enough to lift the link at all from the rim of the wheel. As the chain and wheel wear, the wear upon the wheel tends to reduce the effective diameter of its rim, while the wear between consecutive links at their pivotal junction has the effect of increasing the distance between consecutive sprocket-engaging shoulders or cross-bars,—that is, to increase the working length of the links. The wear, therefore, both upon the wheel and upon the chain, is equivalent to lengthening the links relatively to the sprocket wheel, or, to state it conversely, to diminishing the diameter of the wheel relatively to the length of the link. Suitable compensation, therefore, will be effected by any device which restores the ratio between the wheel's diameter and the length of the links. This, the screw C may be used to accomplish, by withdrawing it toward the wheel, causing it to protrude from the link so that its protruding end will bear upon the wheel rim, lifting the link up from the same, and so having the effect of an addition to the radius of the wheel equal to the amount that the screw is protruded from the link cross-bar. A convenient construction of the screw is that illustrated, having a suitable slot at each end so that it can be screwed in or out to adjust it to the wheel from either side of the chain. The two ends of the screw being just alike, it is immaterial for the purpose of this adjustment which side runs upon the wheel. In case of heavy chains, obvious equivalents of the screw may be substituted, but in small chains, it is by far the most effective and easily adjustable device, and the screw may be set either in the cross-bar or in the longitudinal bar or bars of the link.

I apply this feature to a specific form of link which embodies also a second feature of my invention which I will now describe, which is illustrated in Figs. 1, 2, 3, 4, 5, 6, and 9.

I make a link each of whose longitudinal bars A' has a boss or bearing A², projecting laterally at one end, and a smaller boss A³ projecting in the same direction at the other end, the boss A³ being of suitable size to enter the opening in the annular boss or bearing A², so that the consecutive links are thus united, the boss A² of one link encircling the boss $A^3$ of the next link. The two longitudinal bars $A'$ may be connected and united by the cross-bar B secured in, and, as illustrated, passing through the smaller bosses $A^3$. Said cross-bar B may be made fast in one or both of the longitudinal bars, a convenient mode of accomplishing this being to rivet down the ends of a cross-bar at the outer surface of the longitudinal bars, but other means may be adopted. The adjusting screw C in this link is preferably located in the cross-bar B. In the form shown in Figs. 2 and 6, the corresponding bosses $A^3$ of the longitudinal bars abut each other, and entirely conceal the cross-bar B, but are cut away each at the inner edge, at corresponding points to permit the screw C to protrude between them, or, as it were, through the apertures made by their coinciding notches $a^3$; and in like manner the encircling bosses $A^2$ of the adjacent link are cut away at corresponding points $a^2$, to allow the screw C to protrude between and past them when it is desired to so adjust it.

Instead of extending the bosses so that they abut against each other, as shown in Figs. 2 and 6, I prefer generally to form the cross-bar B with an enlargement $B'$, which stands between the opposed bosses of the longitudinal bars, and which affords greater body of material in which to set the adjusting screw C. This form is illustrated in Figs. 1, 3, 4 and 5. When this latter form is adopted, it is essential that the cross-bar be so secured to the longitudinal bar that it cannot turn with respect to them, lest, if it could turn freely, the screw might not keep its proper position protruding toward the drive wheel, but might work around so that it would protrude in the direction of the length of the link between the longitudinal bars, and so be in danger of becoming the bearing point for the sprocket instead of the bearing point for the rim of the wheel, contrary to the intention of the structure. In the form shown in Figs. 2 and 6, however, the circumferential extent of the notches $a^2$ limits the possibility of the displacement of the screw C by the cross-bar turning in the longitudinal bars, and when that construction is adopted, it is not necessary to take the precaution of securing the cross-bar against turning in the longitudinal bars.

In the form shown in Figs. 1, 2, 3, 4, and 5, wherein the cross-bar has the enlargement $B'$, this enlargement should not be greater in diameter than the bosses $A^2$, and it is preferably made slightly less, so that it does not prevent the bosses receiving the contact of the sprocket.

The longitudinal bar is preferably cut away at the end which has the larger boss over a sectoral portion, conveniently about one hundred and eighty degrees, of the boss, and the rabbet $a'$ thus formed receives the end of the next longitudinal bar having the smaller boss. This construction renders it possible to avoid lapping one longitudinal bar outside the next, and so diminishes the entire width of the chain by the amount of the thickness of both longitudinal bars. Since by this mode of construction, the side of the longitudinal bar opposite that from which the bosses protrude is rendered perfectly straight, it is possible to construct the chain by placing the two half links back to back, and thereby adapt the chain to work on a wheel having split sprockets. This form is shown in Fig. 9. In this form the cross-bar may often safely be wholly omitted, since the sprockets will keep the two halves of the link together while the chain is passing around the wheel, and unless the chain is very slack, or the wheels very far apart, will also keep the chain from parting between the wheels. The adjusting screw C is in that case set into the longitudinal bar.

I claim—

1. In a drive chain, in combination with the links, respectively, screws set thereinto transversely to the plane which contains the axes of the pivots of the links to their adjacent links, such screws being adapted to protrude from the surface of the link in contact with the surface of the wheel between the sprocket teeth of the latter and being adjustable by screwing them in and out to vary the extent of such protrusion: substantially as set forth.

2. In a drive chain, the links having the threaded holes extending through their bars respectively transversely to the plane which contains the axes of the pivots of the links to their adjacent links, combined with screws set in such holes respectively, and adapted to be adjusted to protrude therefrom optionally at either side of the chain into contact with the surface of the sprocket wheel between the the sprockets: substantially as set forth.

3. In a drive chain link, in combination with two longitudinal bars having each a projecting boss at each end, the boss at one end being of suitable diameter to enter the aperture in the boss at the other end; and the cross-bar B joining the smaller bosses of the longitudinal bars: substantially as set forth.

4. In a drive chain link, in combination with the two longitudinal bars having at each end an inwardly projecting boss, the boss at one end being large enough to encircle the boss at the other end; a cross-bar uniting the smaller bosses of the two longitudinal bars; and the screw C set into the cross-bar between said bosses, and extended transversely to the plane of the axes of the pivots of the link, and adapted to be protruded more or less at will: substantially as set forth.

5. In a drive chain link, in combination with the two longitudinal bars having each an inwardly projecting boss at each end, the boss at one end being large enough to encircle the boss at the other end, a cross-bar uniting the smaller bosses and having an enlargement located between said bosses; and a screw C set in said enlargement, extending transversely to the plane of the axes of the pivots of the link, and adapted to be protruded more or less at will: substantially as set forth.

In testimony whereof I have hereunto set my hand, in the presence of two witnesses, at Chicago, Illinois, this 22d day of February, 1889.

THOS. B. JEFFERY.

Witnesses:
N. G. HARRIS,
H. M. DUNLOP.